United States Patent
Kadota

[19]

[11] Patent Number: 6,166,824
[45] Date of Patent: Dec. 26, 2000

[54] PRINT DATA PROCESSING AND COMPRESSION APPARATUS

[75] Inventor: Masatoshi Kadota, Takahama, Japan

[73] Assignee: Brother Kogyo Kabushiki Kaisha, Nagoya, Japan

[21] Appl. No.: 09/009,890

[22] Filed: Jan. 21, 1998

[30] Foreign Application Priority Data

Jan. 22, 1997 [JP] Japan .................................. 9-024303

[51] Int. Cl.[7] .................................................. G06F 15/00
[52] U.S. Cl. ........................................ 358/1.15; 358/1.9
[58] Field of Search ..................... 382/258, 259, 382/232, 252; 358/426, 261.4, 1.1, 1.2, 1.6, 1.9, 1.13, 1.15, 1.16, 1.11, 1.17, 1.18, 261.2, 404, 444, 456, 457, 458, 459, 460, 534, 535, 536, 429, 298

[56] References Cited

U.S. PATENT DOCUMENTS

| | | | |
|---|---|---|---|
| 5,142,620 | 8/1992 | Watanabe et al. | 345/508 |
| 5,187,592 | 2/1993 | Sugiyama et al. | 358/430 |
| 5,416,603 | 5/1995 | Suzuki et al. | 358/426 |
| 5,479,587 | 12/1995 | Campbell et al. | 358/1.17 |
| 5,604,846 | 2/1997 | Kadota | 358/1.16 |
| 5,717,793 | 2/1998 | Ushida et al. | 382/298 |
| 5,901,278 | 5/1999 | Kurihara et al. | 358/1.15 |
| 5,903,360 | 5/1999 | Honma et al. | 358/450 |

FOREIGN PATENT DOCUMENTS 1-122267   5/1989   Japan .

*Primary Examiner*—Dov Popovici
*Attorney, Agent, or Firm*—Oliff & Berridge, PLC

[57] ABSTRACT

In a print data processing apparatus and an input data generating apparatus, image data of an original image generated by a personal computer is binarized in a selected binary mode. The designation number Dn of the selected binarization mode is transmitted with the binary image data to a laser printer. In the laser printer, a data thinning mode-designating number Pn corresponding to the designation number Dn received is set. If the capacity of a development buffer is insufficient, the mode-designating number Pn is read and identified. If Pn="X1", thinning is performed in a first data thinning mode. If Pn="Y2", thinning is performed in a second data thinning mode. If Pn="Z3", thinning is performed in a third data thinning mode. Therefore, if the capacity of a storage device for storing dot image data to be supplied for printing becomes insufficient, dot image data can be reduced in size in an optimal irreversible compressing device selected in accordance with the type of original image.

15 Claims, 14 Drawing Sheets

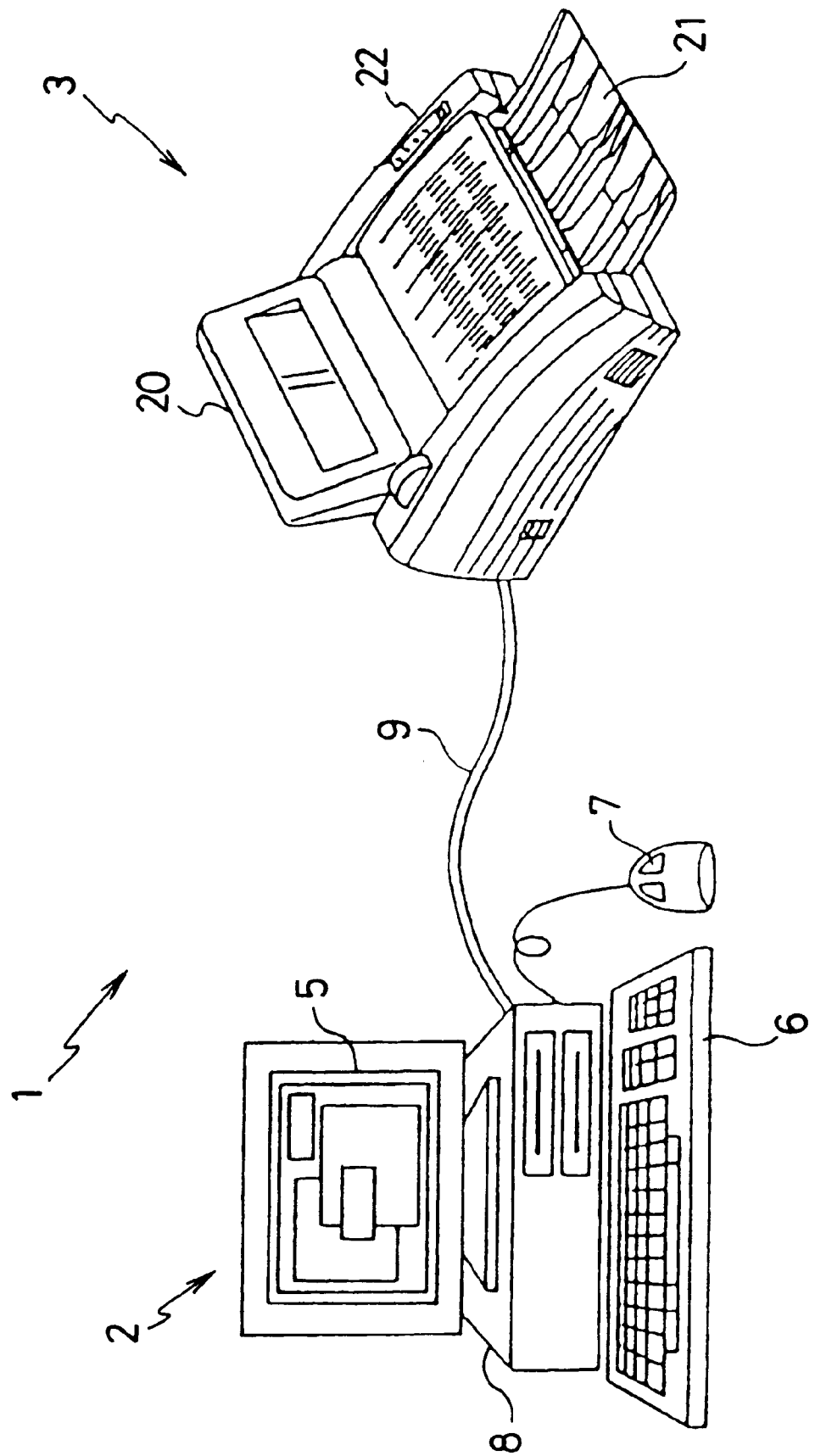

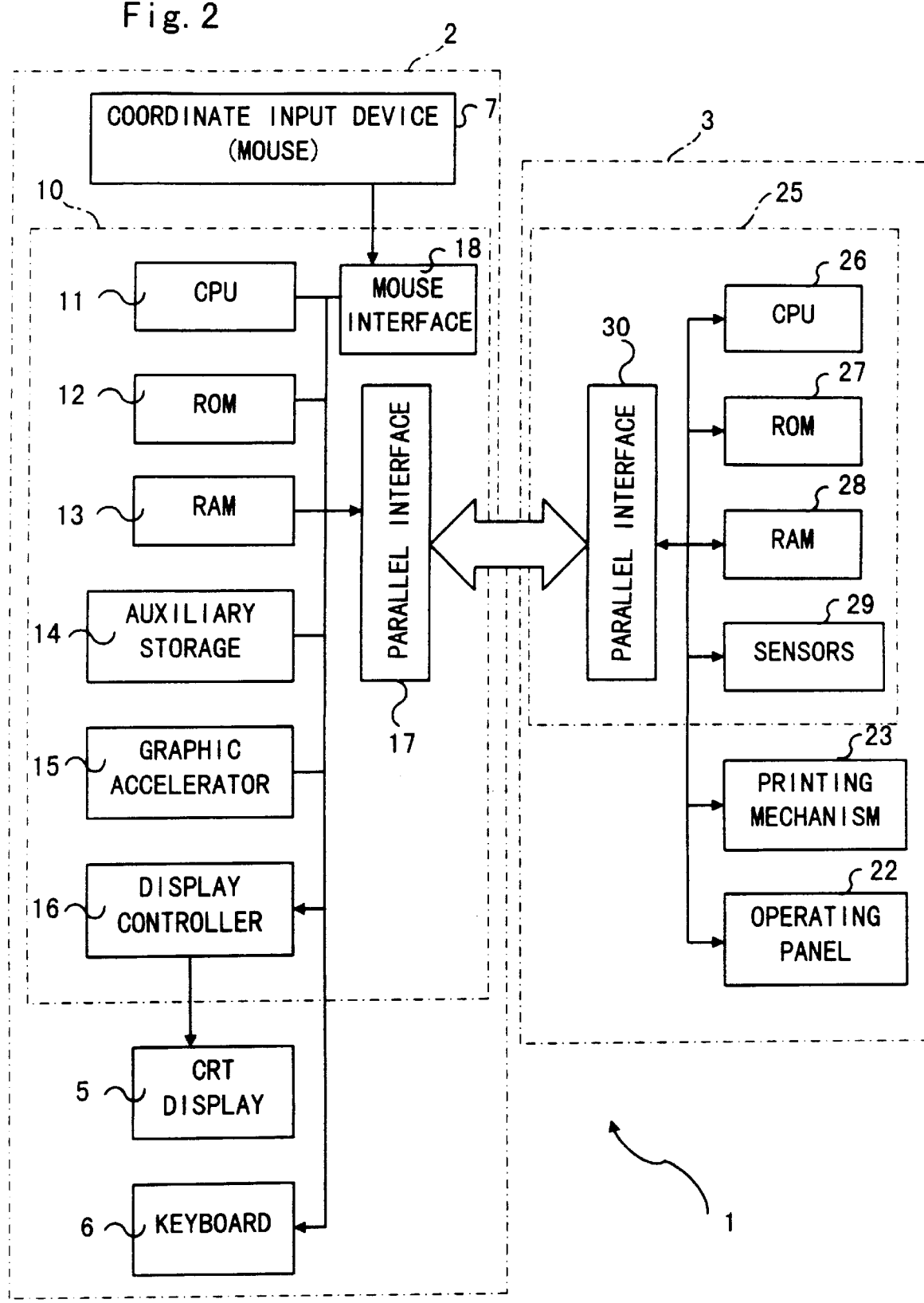

Fig. 3a

FIRST DATA THINNING OPERATION

|  | COLUMN | | | | | | | |
|---|---|---|---|---|---|---|---|---|
|  | A | B | C | D | E | F | G | · · · · |
| 1 | A1 | B1 | C1 | D1 | E1 | F1 | G1 | · · · · |
| 2 | A2 | B2 | C2 | D2 | E2 | F2 | G2 | · · · · |
| 3 | A3 | B3 | C3 | D3 | E3 | F3 | G3 | · · · · |
| ROW 4 | A4 | B4 | C4 | D4 | E4 | F4 | G4 | · · · · |
| 5 | A5 | B5 | C5 | D5 | E5 | F5 | G5 | · · · · |
| 6 | A6 | B6 | C6 | D6 | E6 | F6 | G6 | · · · · |
| 7 | A7 | B7 | C7 | D7 | E7 | F7 | G7 | · · · · |

Fig. 3b

|  | COLUMN | | | | |
|---|---|---|---|---|---|
|  | A | C | E | G | · · · · |
| 1 | A1 | C1 | E1 | G1 | · · · · |
| ROW 3 | A3 | C3 | E3 | G3 | · · · · |
| 5 | A5 | C5 | E5 | G5 | · · · · |
| 7 | A7 | C7 | E7 | G7 | · · · · |

Fig. 4a

SECOND DATA THINNING OPERATION

| | | COLUMN | | | | | |
|---|---|---|---|---|---|---|---|
| | | A | B | C | D | E | F | . . . . |
| ROW | 1 | A 1 | B 1 | C 1 | D 1 | E 1 | F 1 | . . . . |
| | 2 | A 2 | B 2 | C 2 | D 2 | E 2 | F 2 | . . . . |
| | 3 | A 3 | B 3 | C 3 | D 3 | E 3 | F 3 | . . . . |
| | 4 | A 4 | B 4 | C 4 | D 4 | E 4 | F 4 | . . . . |

Fig. 4b

| | | COLUMN | | | |
|---|---|---|---|---|---|
| | | AB | CD | EF | . . . . |
| ROW | 1 | AB 1 | CD 1 | EF 1 | . . . . |
| | 2 | AB 2 | CD 2 | EF 2 | . . . . |
| | 3 | AB 3 | CD 3 | EF 3 | . . . . |
| | 4 | AB 4 | CD 4 | EF 4 | . . . . |

Fig. 5a

THIRD DATA THINNING OPERATION

|   | | COLUMN | | | | | |
|---|---|---|---|---|---|---|---|
|   |   | A | B | C | D | E | F | . . . . |
| ROW | 1 | A1 | B1 | C1 | D1 | E1 | F1 | . . . . |
|  | 2 | A2 | B2 | C2 | D2 | E2 | F2 | . . . . |
|  | 3 | A3 | B3 | C3 | D3 | E3 | F3 | . . . . |
|  | 4 | A4 | B4 | C4 | D4 | E4 | F4 | . . . . |

Fig. 5b

|   |   | COLUMN | | | |
|---|---|---|---|---|---|
|   |   | AB | CD | EF | . . . . |
| ROW | 1 | AB1 | CD1 | EF1 | . . . . |
|  | 2 | AB2 | CD2 | EF2 | . . . . |
|  | 3 | AB3 | CD3 | EF3 | . . . . |
|  | 4 | AB4 | CD4 | EF4 | . . . . |

PRINT DATA PROCESSING AND COMPRESSION APPARATUS

BACKGROUND OF THE INVENTION

1. Field of the Invention

The invention relates to a print data processing apparatus that reduces the amount of dot image data by irreversible compression if the storage capacity for storing developed printable dot image data that is received is insufficient. The invention also relates to an input data generating apparatus that converts original image data generated into binary image data, and transmits the binary image data to the print data processing apparatus.

2. Description of the Related Art

Conventional print systems include a document processing apparatus, such as a host computer, a personal computer or similar apparatus which generates image data, and converts the image data into binary image print data, and transmits the print data to a page printer capable of high-speed printing, such as a laser printer.

In such a document processing apparatus, various application programs and a printer driver are installed. A color image or black-and-white character data, draw data or a graphic data is generated by an appropriate application program, and a printer driver performs binarization of such generated data. Specifically, the printer driver converts the generated data into binary image print data described in dot data of "1" or "0" using a page-description language (PDL), such as PostScript®, and a print control language, such as Printer Control Language (PCL)®, and then transmits the binarized dot image data to a printer.

For the binarization, dithering is normally employed in which "1" or "0" is determined for each dot using a dither matrix. Other methods have also been put into practical use, such as an average error minimum method and an error diffusion method. In the average error minimum method and the error diffusion method, binarization is performed while an error between a specific pixel and an adjacent pixel is being evaluated on the basis of an error matrix. Regarding the dither matrix and the error matrix, a matrix is normally used that achieves an increased resolution by sacrificing gradation for a line image, or a matrix that achieves an increased gradation for a picture image.

As laser printers are generally termed "page printers", a typical laser printer prints an image for one page every time the printer receives print data for a page. A laser printer is normally equipped with a memory of several megabytes (MB) since a memory capacity of approximately 4 MB is required for dot image data for a page of, for example, A4 size, with a resolution of 300 dots per inch (DPI), and more memory capacity is required for storing font data. However, a memory shortage may occur when a large amount of dot image data for a page is to be developed. In such a case, either only a portion of the page data is printed, or an error occurs which prevents printing altogether. To solve this memory shortage problem, the invention disclosed in, for example, U.S. Pat. No. 5,604,846, reduces the amount of dot image data by performing a data thinning operation. Specifically, data is irreversibly compressed in such a manner that the resolution of the dot image data decreases.

Regarding the thinning operation, a simple thinning operation has been put into practical use which reduces the amount of dot data developed into the form of a matrix by selectively deleting dot data of, for example, all the even-numbered (or odd-numbered) dot rows and all the even-numbered (or odd-numbered) dot columns. An error evaluation thinning operation is proposed in, for example, Japanese Patent Application Laid-Open No. Hei 1-122267, which, when reducing the amount of dot data, performs evaluation with reference to error values based on the average density of a predetermined area of the original image data or arrangement conditions of dot data.

In page printers, such as laser printers, wherein the simple thinning of dot image data is always performed when low memory occurs, high speed thinning can be performed by simply deleting the data of a plurality of even-numbered (or odd-numbered) dot rows and the data of a plurality of even-numbered (or odd-numbered) dot columns. Although the simple thinning operation does not cause a problem in draft printing, or character or symbol printing, the simple thinning operation causes problems in images, such as photo-images, wherein density tone is important, or pop art-type line drawing images that have a regularity of dot arrangement. Thus, the density tone changes, or horizontal or vertical lines are partially lost, thereby degrading image quality.

The aforementioned error evaluation thinning operation may be used to solve these problems. However, if the error evaluation thinning of dot image data is always performed when low memory occurs, substantial deterioration of image quality (resolution) of photo-images or drawing images may be prevented but a long processing time is required due to the evaluation of error values based on dot arrangement. This is inconvenient for draft printing or character or symbol printing where a certain amount of image quality deterioration is acceptable.

SUMMARY OF THE INVENTION

Accordingly, it is an object of the invention to provide a print data processing apparatus and an input data generating apparatus wherein dot image data to be supplied for printing can be compressed in an optimal irreversible compression manner that is selected in accordance with the type of original image.

According to one aspect of the invention, there is provided a print data processing apparatus including a memory for storing dot image data, and a plurality of irreversible compression devices that can be started when a capacity of the memory is insufficient to store dot image data. The irreversible compression devices irreversibly compress the dot image data and store the compressed dot image data into the memory. If the capacity of the memory is insufficient to store dot image data, a compression mode selection device selects one of the plurality of irreversible compression devices and starts the selected irreversible compression device. A printing device prints the dot image data which has been compressed and stored in the memory by the selected irreversible compression device.

Since the irreversible compression devices are provided for irreversibly compressing dot image data in different compression modes, the compression mode selection device selects an optimal one of the irreversible compression devices to irreversibly compress dot image data if the capacity of the memory is insufficient to store the dot image data. If the dot image data is data for draft printing or data of a character or symbol image, the dot image data is irreversibly compressed by an irreversible compression mode suitable for the original draft or character image. Alternatively, if the dot image data is data of an image, such as a photo-image wherein density tone is important, or data of a pop art-type line drawing image that has a regularity of dot arrangement, the dot image data is irreversibly compressed by an irreversible compression mode suitable for the original image. Therefore, dot image data can be compressed in an irreversible compression mode optimal to the binarization mode of the dot image data, that is, an irreversible compression mode that least degrades the image quality.

In the print data processing apparatus of the invention, the compression mode selection device may include a designation command interpreting device that interprets a compression mode designation command supplied from an input data generating apparatus. Since the designation command interpreting device interprets a compression mode designation command supplied from an input data generating apparatus, it becomes possible to easily select an optimal irreversible compression device corresponding to the compression mode designated by the compression mode designation command.

Furthermore, each irreversible compression device may reduce an amount of dot image data by thinning the dot image data. Due to the thinning operation in accordance with the irreversible compression devices, the amount of dot image data can easily be reduced.

The irreversible compression devices may include a simple thinning device, a second thinning device and a third thinning device. If the dot image data is character or symbol data, or data binarized in an error diffusion mode, the simple thinning device deletes every other row of dot data and every other column of dot data. If the dot image data has been binarized in a fatting dithering mode, the second thinning device reduces the amount of the dot image data using error evaluation of rows and columns of dot data. If the dot image data has been binarized in a Bayer dithering mode, the third thinning device reduces the amount of the dot image data using weighted error evaluation of rows and columns of dot data.

The memory may include a multi-purpose area for storing dot image data received from a development buffer provided in a RAM.

According to another aspect of the invention, there is provided an input data generating apparatus for supplying input data to a print data processing apparatus. The input data generating apparatus includes a binarization mode selection device that selects one of a plurality of binarization modes for data binarization, a conversion device that converts original image data into binary image data in the binarization mode selected by the binarization mode selection device, and a designation command generating device that generates a compression mode-designating command corresponding to the binarization mode selected by the binarization mode selection device. In this input data generating apparatus, the binarization mode selection device selects one of a plurality of binarization modes for data binarization, and the conversion device converts original image data into binary image data in the binarization mode selected by the binarization mode selection device, and the designation command generating device generates a compression mode-designating command corresponding to the binarization mode selected by the binarization mode selection device. The compression mode-designating command and the binary image data are then transmitted to the print data processing apparatus. If the memory capacity is insufficient to store the dot image data transmitted, the dot image is irreversibly compressed in an irreversible compression mode designated by the compression mode-designating command, i.e., an irreversible compression mode suitable for the original image.

In the input data generating apparatus, the plurality of binarization modes may include an error diffusion mode, a fatting dithering mode, and a Bayer dithering mode. Therefore, a binarization mode suitable for the original image can be selected from the error diffusion mode, the fatting dithering mode, and the Bayer dithering mode.

BRIEF DESCRIPTION OF THE DRAWINGS

A preferred embodiment of the invention will be described in detail with reference to the following figures wherein:

FIG. 1 is a perspective view of a printing system according to a preferred embodiment of the invention;

FIG. 2 is a block diagram of a control system of a personal computer and a laser printer according to the embodiment of the invention;

FIG. 3a is a schematic diagram of dot image data of an original image;

FIG. 3b is a schematic diagram illustrating a first data thinning operation;

FIG. 4a is a schematic diagram of dot image data of an original image;

FIG. 4b is a schematic diagram illustrating a second data thinning operation;

FIG. 5a is a schematic diagram of dot image data of an original image;

FIG. 5b is a schematic diagram illustrating a third data thinning operation;

DETAILED DESCRIPTION OF PREFERRED EMBODIMENT

Figure 6:
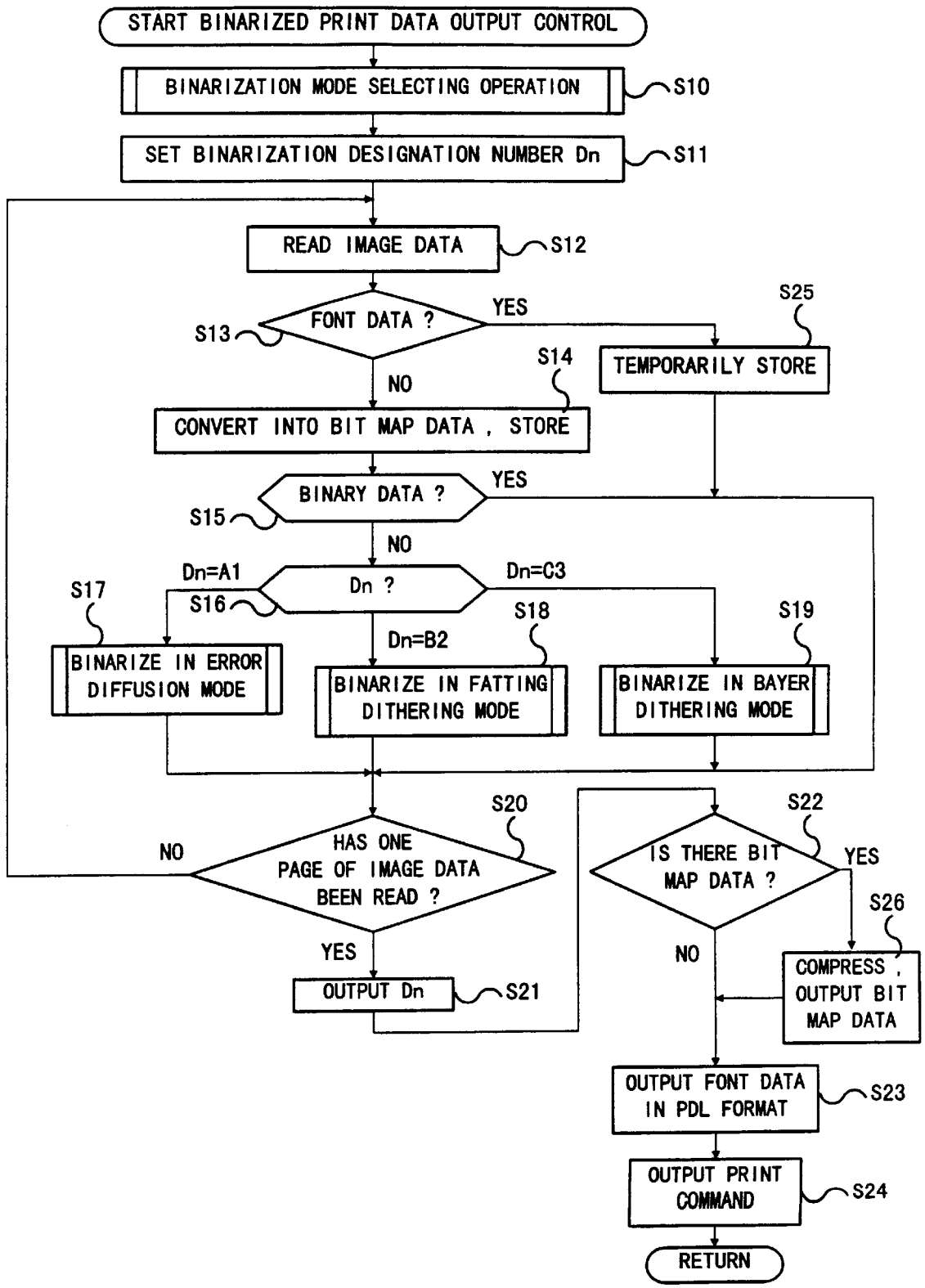
FIG. 6 is a schematic flowchart of a routine of binarized print data output control.
Figure 7:
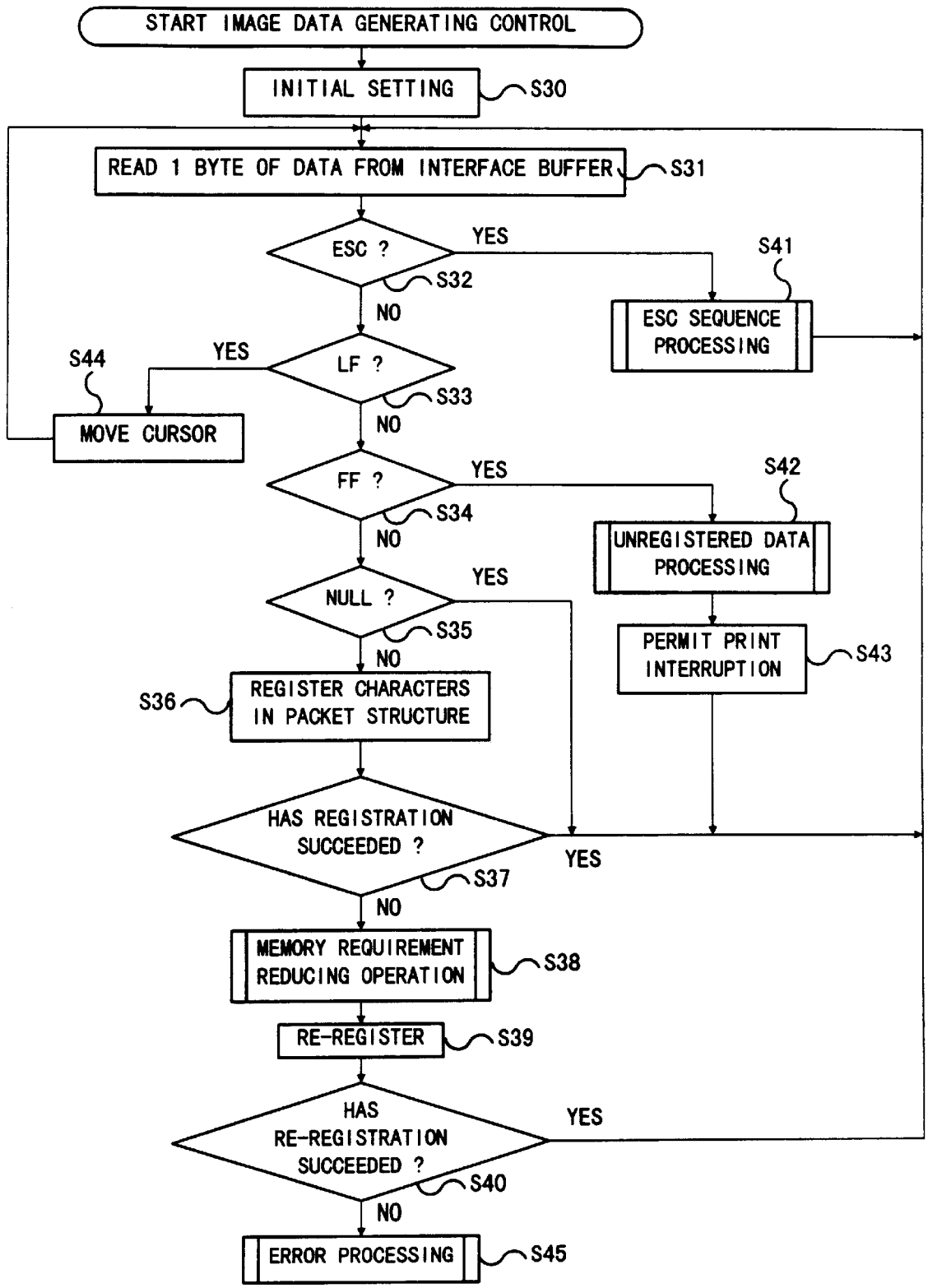
FIG. 7 is a schematic flowchart of a routine of image data generation control.
Figure 8:
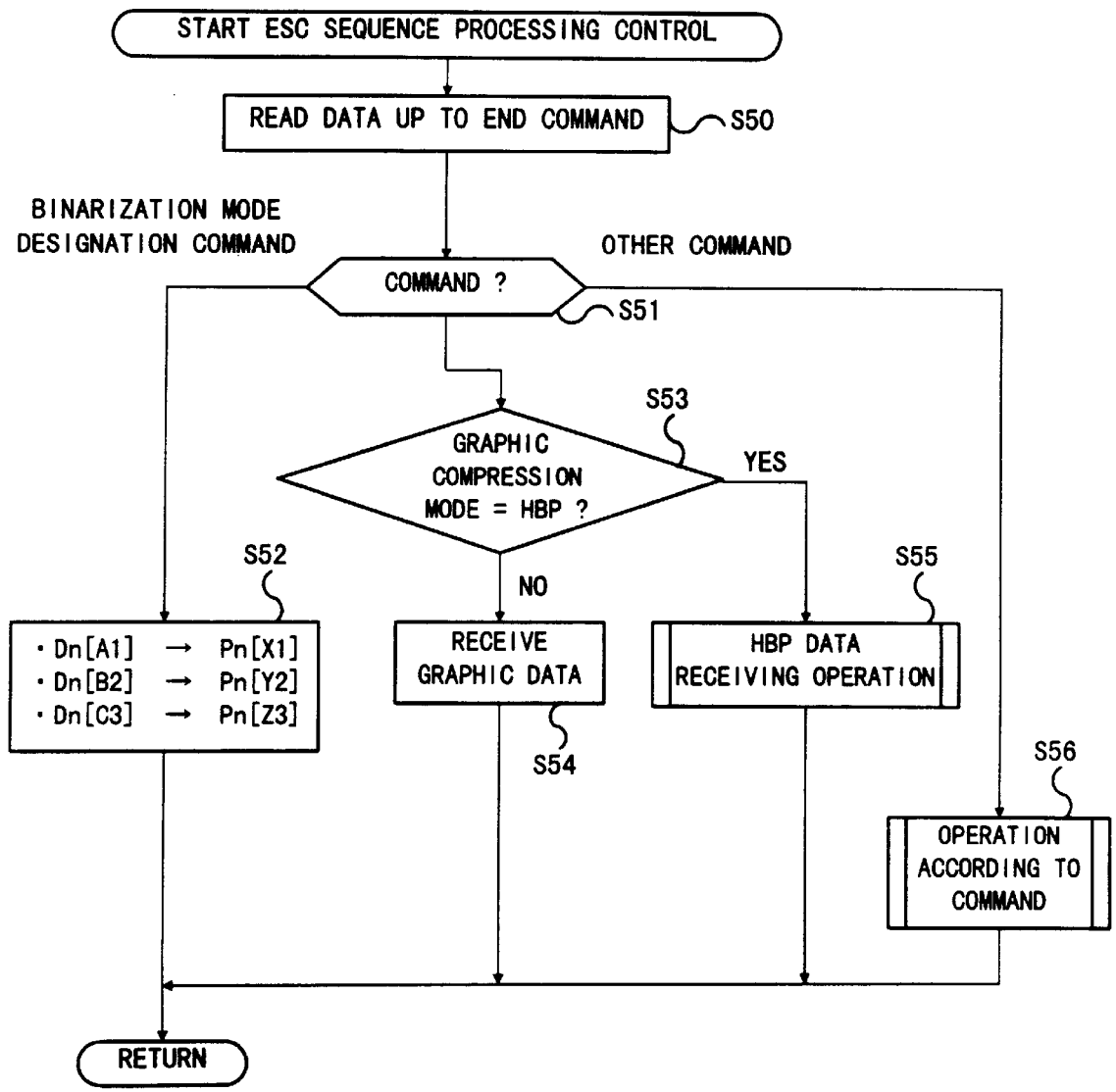
FIG. 8 is a schematic flowchart of a routine of escape sequence processing control.
Figure 9:
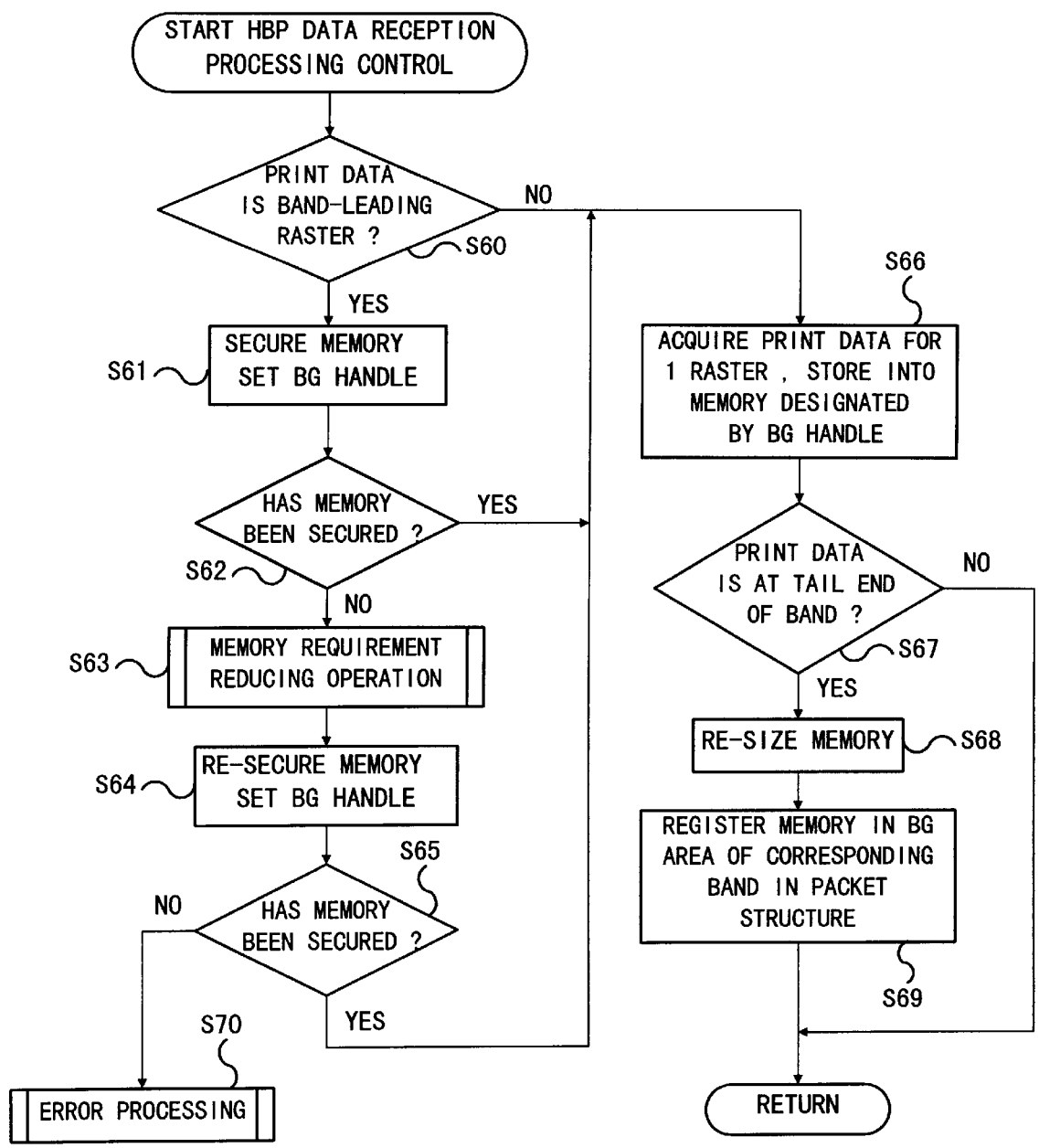
FIG. 9 is a schematic flowchart of a routine of host-based data reception processing control.
Figure 10:
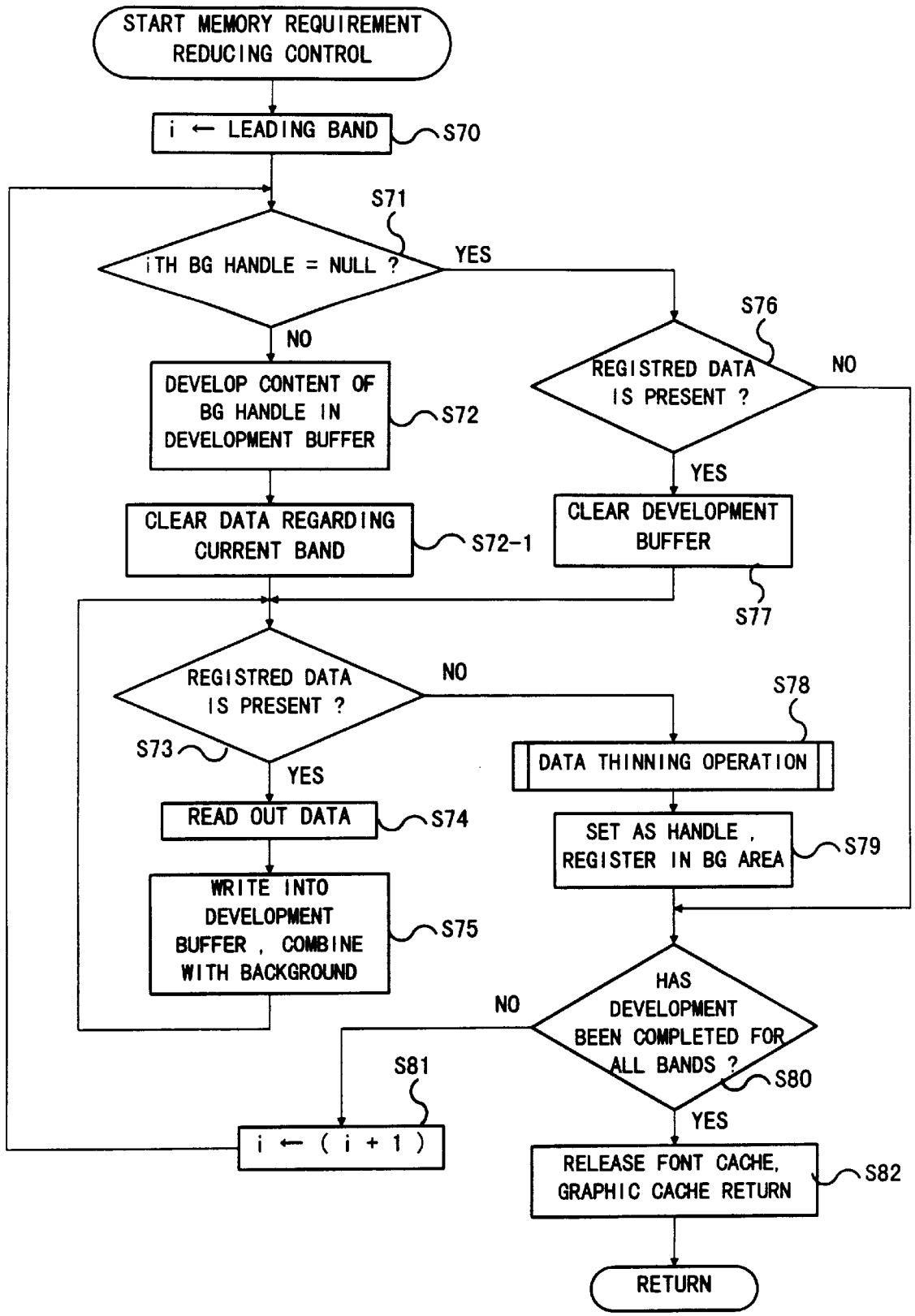
FIG. 10 is a schematic flowchart of a routine of memory requirement reducing control.

A preferred embodiment of the invention will be described in detail hereinafter with reference to the accompanying drawings.

In this embodiment, the invention is applied to a printing system 1 in which a personal computer 2 and a laser printer 3 are connected as shown in FIG. 1. In the printing system 1, data transfer is performed on the basis of a communication protocol according to the IEEE 1284 standard. An IEEE 1284-dedicated connecting cable is used to connect the personal computer 2 and the laser printer 3.

The personal computer 2 (an input data generating apparatus) will be briefly described. As shown in FIG. 1, the personal computer 2 has a cathode ray tube (CRT) display 5, a keyboard 6, a coordinate input device (mouse) 7, and a controller body 8. The controller body 8 is connected to the laser printer 3 by a connecting cable 9. Therefore, various image print data generated by the personal computer 2 can be transmitted to the laser printer 3.

The control system of the personal computer 2 will be described with reference to the block diagram of FIG. 2.

A control device 10 includes a CPU 11, a parallel interface 17, a ROM 12, a RAM 13, an auxiliary storage device 14 formed of, for example, a hard disk device, a graphic accelerator 15, a display controller 16, and a mouse interface 18. These elements are connected to the CPU 11 by a bus, such as a data bus. The keyboard 6 is connected to the bus. The CRT display 5 is connected to display controller 16. The coordinate input device (mouse) 7 is connected to the mouse interface 18.

The auxiliary storage device 14 stores various control programs for functions of the personal computer 2, application programs for generating various image data, such as character or symbol data or line drawing data, a printer driver for binarizing various image data on the basis of a predetermined print control language and compressing the binarized print data in a predetermined mode. The ROM 12 stores various control programs. The RAM 13 stores an application program read from the auxiliary storage device 14 and various data.

The binarization of image data can be performed by a mode selected from a plurality of modes, including an error diffusion mode, a fatting dithering mode, and a Bayer dithering mode. A desired binarization mode can be designated by selecting it in a menu displayed on the CRT display 5 using the keyboard 6, the mouse 7 or similar device.

When a print instruction occurs in the personal computer 2, the printer driver is started to binarize the image data in a designated binarization mode and to compress the binarized data. Then, print data, including language expressing data by a page-description language, control commands, and the compressed image data are transmitted to the laser printer 3.

The laser printer 3 (a print data processing apparatus) will be described with reference to FIGS. 1 and 2. The laser printer 3 has a feeder 20 and a printing mechanism 23. The printing mechanism 23 has a laser scanning mechanism, a process cartridge, a transfer-separation mechanism, a fixing mechanism, and a conveying mechanism. A plurality of sheets (not shown) set in the feeder 20 are fed and conveyed to the printing mechanism 23 one sheet at a time. An electrostatic latent image formed on a photo-sensitive drum by a laser beam is developed by toner deposition. The toner image is then transferred and fixed to a sheet. The sheet is then discharged onto a discharge tray 21. An operating panel 22 that includes various indicator lamps, switches and a small-size display is provided on a right hand-side frame of the printer body as shown in FIG. 1.

The control system of the laser printer 3 will be described with reference to FIG. 2.

A control device 25 includes a CPU 26, a parallel interface 30, a ROM 27, a RAM 28, sensors 29 that include a sheet feed sensor, a sheet discharge sensor and a remaining toner amount sensor. These elements are connected to the CPU 26 by a bus, such as a data bus. The printing mechanism 23 and the operating panel 22 are also connected to the bus.

Figure 14:
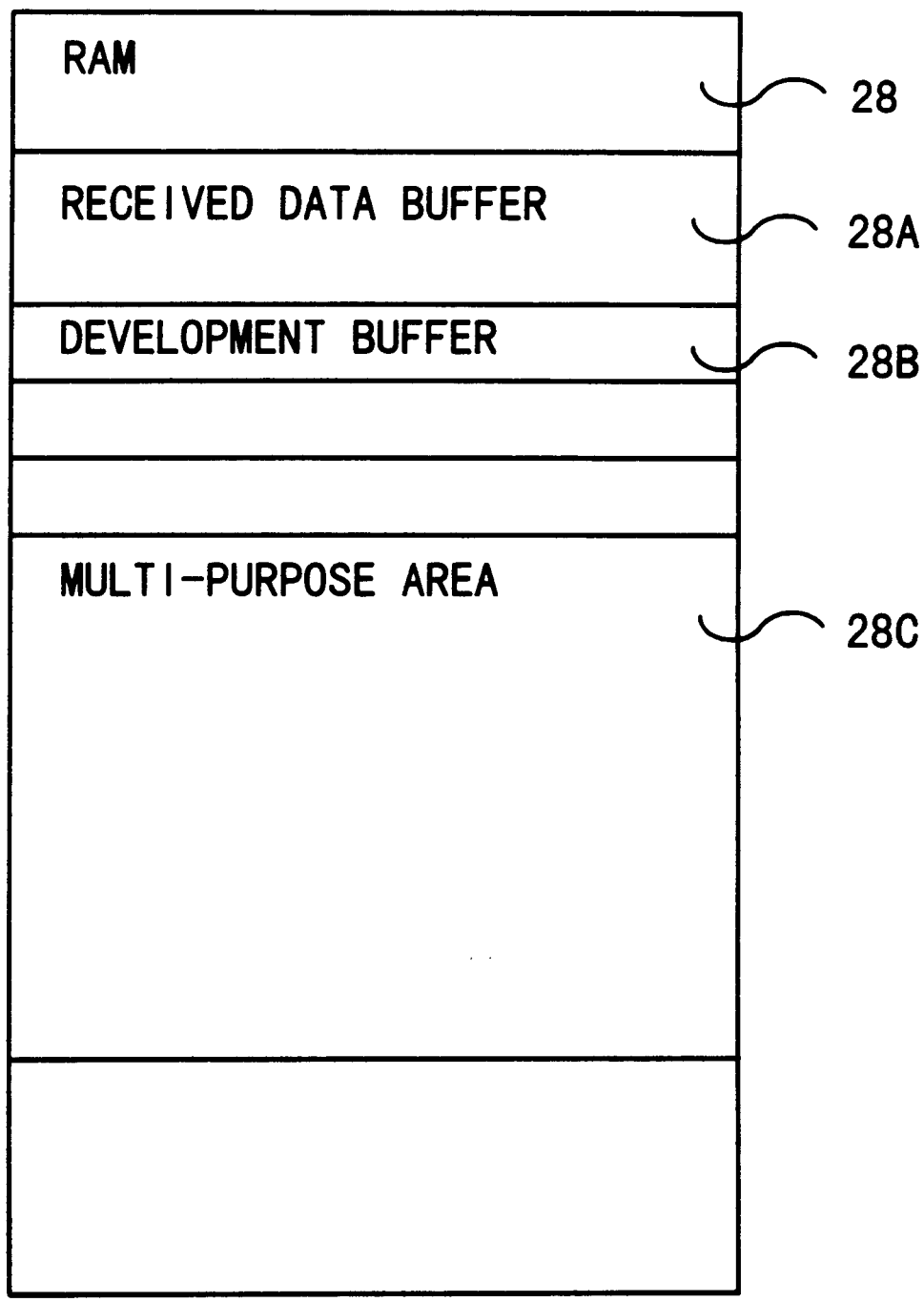
FIG. 14 is a conceptual diagram showing storage areas in a RAM of a laser printer.

The ROM 27 stores various control programs for print control and a data development control program for developing received print data into dot image data. As shown in FIG. 14, the RAM 28 has a received data buffer 28A for storing received print data, a development buffer 28B for storing dot image data of 3 bands, and a multi-purpose area 28c for storing font data and graphic data. The RAM 28 also has various buffers and pointers for temporarily storing results of operations by the CPU 26.

The ROM 27 stores a control program for data thinning processing control whereby the amount of dot image data is reduced by a mode selected from different thinning modes. Thus, this control program constitutes an irreversible compression device.

The data thinning operation can be performed in three modes, i.e., first to third data thinning modes, as illustrated in FIGS. 3–5. In FIGS. 3–5, black dots whose dot data is set to "1" are indicated by dot-shading.

The first data thinning mode will be described with reference to FIGS. 3*a* and 3*b*. In the development buffer, dot image data is developed in the form of a matrix of a plurality of dot columns (column A, column B, column C, column D, . . . )×a plurality of dot rows (row 1, row 2, row 3, row 4, . . . ) as indicated in FIG. 3*a*. A plurality of even-number dot columns (column B, column D, column F, . . . ) are a plurality of even-number dot rows (row 2, row 4, row 6, . . . ) are deleted.

As a result, reduced matrix dot image data is obtained wherein a plurality of odd-number dot columns (column A, column C, column E, . . . )×a plurality of odd-number dot rows (row 1, row 3, row 5, . . . ) remain. The amount of data is reduced to approximately ¼ its original amount by this simple thinning operation. Thus, the data thinning in the first mode can be performed at a high speed, and is suitable for print data thinning in the case of draft printing for merely checking a print result, or in the case of print data of a character or symbol image or print data binarized in the error diffusion mode.

The second data thinning mode, involving error evaluation, will be described with reference to FIGS. 4*a* and 4*b*. For the second data thinning operation of dot image data stored in the development buffer (FIG. 4*a*) as in the case shown in FIG. 3, the dot data of two neighboring dots are sequentially added. In determining an error value of the corresponding dot in a thinned dot image data matrix, black is regarded as a value of "2" and white is regarded as a value of "0". In the case shown in FIG. 4*a*, the dot data "0" of the dot A1 and the dot data "1" of the next dot B1 in the first row are added first. The sum of the dot data is "1", which is less than the black value "2". Then, the dot data of the dot AB1 in a thinned dot image data matrix is set to "1" (black) as shown in FIG. 4*b*. Since the dot data of the dot AB1 is set to "1" (black) although the dot data sum "1" is less than the black value "2", an error value "−1" is set.

Subsequently, the sum of the dot data "0" of the dot C1 and the dot data "1" of the next dot D1 is considered. Although the sum of the dot data is "1", the dot data of the dot CD1 is set to "0" (white) as shown in FIG. 4*b*, by adding the error value "1". Then, an error value "+1" is set indicating the difference between the dot data sum "1" and the set dot data "0". Likewise, the dot data of the next two dots E1 and F1 is reduced by thinning, so that the dot data of the dot EF1 in the thinned dot image data matrix becomes "1" (black) based on the dot data sum and the error value.

The dots of the second row, i.e., A2, B2, C2, D2, . . . , are subsequently thinned to provide the dots AB2, CD2, EF2 . . . with dot data determined as described above. For example, all the dots AB2, CD2 and EF2 are set to dot data "1" (black) since the dot data of the dots A2–F2 are all "1". By repeating this operation on all the rows, the thinned dot image data matrix shown in FIG. 4b is obtained. The thinned dot image data is further thinned by performing a similar operation on all the columns AB, CD, EF, . . . , so that a dot image data matrix is obtained which is reduced in data amount to approximately ¼ its original amount. Therefore, the second data thinning mode is suitable for binary print data of an image that has a low density variation, such as a pop art-type line drawing image, which has been binarized by the fatting dithering mode.

The third data thinning mode, involving error evaluation, will be described with reference to FIGS. 5a and 5b. For the third data thinning operation of dot image data stored in the development buffer as shown in FIG. 5a, the dot data of two neighboring dots are sequentially added. Black is regarded as "2" and white is regarded as "0" in determining an error value of the corresponding dot in a thinned dot image data matrix, as in the second thinning operation. Specifically, since the sum of the dot data of the dots A1 and B1 is "1", the dot data of the dot AB1 is set to "1" (black) as shown in FIG. 5b, with an error value set to "−1". Since the sum of the dot data of the dots C1 and D1 is "1", the dot data of the dot CD1 is set to "0" (white) as shown in FIG. 5b, as in the second thinning mode.

With regard to the dots E1 and F1, the sum "1" of the dot data is added to the sum of an evaluation value "−0.3" which relates to dot AB1 and is obtained by multiplying the error value "−1" of the dot AB1 by a coefficient "0.3" (weighting), and an evaluation value "0.7" which relates to dot CD1 and is obtained by multiplying the error value "+1" of the dot CD1 by a coefficient "0.7" (weighting), thereby providing a final evaluation value "1.4". Since the final evaluation value is greater than "1", the dot data of the dot EF1 is set to "1". Therefore, the third data thinning mode is suitable for the thinning of binary print data of an image that has a high density variation, such as a photo-image, which has been binarized in the Bayer dithering mode.

A routine of binarized print data output control performed by the printer driver provided in the auxiliary storage device 14 will be described with reference to the flowchart of FIG. 6. It is assumed herein that image data for printing is prepared before this control is started. In the description below, Si (i=10, 11, 12, . . . ) indicates steps of the control routine.

The binarized print data output control is started when a print instruction is inputted from the keyboard 6 or the mouse 7. After preparation for reading image data designated for printing, a binarization mode selecting operation is performed in step S10. Step S10 constitutes a mode selection device.

After CRT display 5 displays the names of the binarization modes, including the error diffusion mode, the fatting dithering mode, and the Bayer dithering mode, a user selects a desired mode using the coordinate input device 7. If the user desires binarization with a higher fidelity to the original image and free of periodicity, the user selects the error diffusion mode. For a pop art-type line drawing image or similar image that has a low density variation, the user selects the fatting dithering mode. For a photo-image or similar image, the user selects the Bayer dithering mode.

In step S1, the designation number Dn of the binarization mode selected by the user is stored in a work memory of the RAM 13. The designation number Dn constitutes a compression mode-designating command, and step S11 constitutes a designation command generating device. If the error diffusion mode is selected, a designation number Dn of "A1" is generated. If the fatting dithering mode is selected, a designation number Dn of "B2" is outputted. If the Bayer dithering mode is selected, a designation number Dn of "C3" is generated. The generated designation number Dn is set.

In step S12, the image data transferred via an application program is read. It is determined in step S13 whether the read image data is font data. If it is font data (Yes in step S13), the font data is temporarily stored in a font data memory space provided in the RAM 13 in step S25.

Conversely, if the read image data is vector data or image data of characters, symbols, graphics or other images (No in step S13), the image data is converted into bit map data and the converted data is stored in a bit map data memory space in the RAM 13 in step S14. This conversion is performed at a high speed by the graphic accelerator 15.

In step S15, it is determined whether the bit map data converted in step S14 is binary data. If it is not binary data, i.e., if it is color image data or other multivalue image data that includes gradation (No in step S15), the designation number Dn of the set binarization mode is identified in step S16. If the designation number Dn is "A1", the image data is binarized in the error diffusion mode in step S17. If the designation number Dn is "B2", the image data is binarized in the fatting dithering mode in step S18. If the designation number Dn is "C2", the image data is binarized in the Bayer dithering mode in step S19. Steps S17–S19 constitute a conversion device. After the operation of step S25 or steps S15–S19 ends, it is determined in step S20 whether the reading of image data for one page has been completed. If the image data reading is not completed (No in step S20), the operation of steps S12–S20 is repeated.

If the entire image data for one page has been read (Yes in step S20), the binarization mode designation number Dn read from the work memory of the RAM 13 is converted into an escape sequence-form command and the command is outputted for transmission in step S21.

It is then determined in step S22 whether bit map data is stored in the bit map data memory. If bit map data is stored in the bit map data memory (Yes in step S22), the bit map data is compressed, and combined with the escape sequence-form command, and then outputted for transmission in step S26. Since the bit map data represents the content of background within the image data, the bit map data is transmitted earlier than the font data, in order to form a base bit map in the RAM 28 of the laser printer 3.

The data compression in step S26 is performed in the same compression mode as in the compressing operation that is conventionally performed to transmit image data to a host based-type printer. To enable the laser printer 3 to recognize the compression mode, an escape sequence that indicates the host based-type compression is added to the leading end of the compressed bit map data.

Subsequently, if there is font data, the font data is converted into the format of the page-description language (PDL), and then outputted to the laser printer 3 in step S23. The PDL format includes, for example, codes indicating font shape and coordinates.

When the bit map data and font data for one page is transmitted to the laser printer 3, a code data FF, which is a print command, is transmitted at the end in step S24. The operation then returns to the main routine. If image data for the next page is read via the application program, this control routine is repeated, thereby transmitting a plurality of pages of print data, one page at a time.

A routine of image data generating control performed by the control device 25 of the laser printer 3 will be described with reference to the flowcharts of FIGS. 7–11.

When this control routine is started, initial setting is performed in step S30. Since received data has been sequentially stored into the received data buffer 28A of the RAM 28, via the parallel interface 30, 1 byte of data is read from the buffer in step S31. It is then determined in step S32 whether the 1-byte data is an escape (ESC) code indicating the start of an escape sequence. If it is an ESC code (Yes in step S32), escape sequence processing control (FIG. 8) is performed in step S41.

When the escape sequence processing control is started, the entire sequential data from the start code to the end-instructing command is read in step S50.

Subsequently, the command data of the escape sequence is retrieved and identified in step S51. If it is a command that designates a binarization mode, a data thinning mode designation number Pn is set based on the binarization mode designation number Dn contained in the command in step S52. Specifically, if the designation number Dn is "A1", "X1" is set as a data thinning mode designation number Pn. If the designation number Dn is "B2", "Y2" is set as a data thinning mode designation number Pn. If the designation number Dn is "C3", "Z3" is set as a data thinning mode designation number Pn. Then, this control routine ends and returns.

If the command is a graphic data reception command, it is determined in step S53 whether the graphic compression mode is set to "HBP". If it is not "HBP" (No in step S53), the command is received as graphic data transmitted as a portion of the PDL in step S54. This step is provided for receiving graphic data expressed in a conventional language. Conversely, if the graphic compression mode is set to "HBP" (Yes in step S53) when the command is a graphic data reception command, a routine of host-based data reception processing control (FIG. 9) is performed in step S55.

When the host-based data reception processing control routine is started, it is determined in step S60 whether the received print data of host-based type is data for a leading raster of a band. If it is data for a leading raster of a band (Yes in step S60), a maximum memory space needed to store data for the band is secured in the multi-purpose area 28C of the RAM 28, and a background (BG) handle is set for management of the memory space in step S61. The "band" means each of the regions formed by dividing the rasters of the single page to be printed into groups of a predetermined number (for example, 128) of rasters. The print data is managed separately for the individual rasters.

In step S62, it is determined whether the required memory space has been successfully secured. If the required memory space has been secured (Yes in step S62), print data for one raster is taken in and stored in the memory space designated by the BG handle in step S66. Subsequently, it is determined in step S67 whether the raster print data is at the tail end of the band. If it is not at the tail end (No in step S67), the operation returns. If it is at the tail end of the band (Yes in step S67), it means that storage of the graphic data corresponding to the band has been completed. Therefore, a memory resizing operation is performed in step S68, in order to release an unused space of the memory space secured in step S61 so that the unused space can be used.

In step S69, the resized memory space is set in the multi-purpose area 28C of the RAM 28 and registered in a background area of the corresponding band within a packet structure wherein the print data is managed separately for the individual bands in step S69. For example, the number of bands and the leading address of the memory space are registered. The operation then returns. In the next and subsequent cycles, the above-described operation is performed on the following band starting at the leading raster. In this manner, the individual bands of the received graphic data are separately stored into appropriate memory spaces and registered in the packet structure.

If print data is not at the leading end of the band (No in step S60), the operation of step S66 and the following steps is performed since a memory space has been secured in the multi-purpose area 28C of the RAM 28.

If the usable memory in the multi-purpose area 28C of the RAM 28 becomes short so that a memory space cannot be secured during the HBP data reception processing control (No in step S62), memory requirement reducing control (FIG. 10) is performed in step S63.

When the memory requirement reducing control is started, the leading band number (for example, "0") is set in a variable i that sequentially indicates the bands starting at the leading band in step S70. It is then determined in step S71 whether the BG handle corresponding to the ith band is null (indicating that BG handle is not set). If it is not null but graphic data is stored in the memory space where BG handle is set (No in step S71), the graphic data of the ith band is expanded and developed in the development buffer 28B, which is set as a temporary area in the RAM 28, in step S72. Then, the data regarding the current band is cleared in step S72-1.

If the BG handle is null (Yes in step S71), it is determined in step S76 whether registered data exists, i.e., whether language-expressed data described in the PDL is registered at a predetermined position in the packet structure corresponding to the ith band. If registered data exists (Yes in step S76), the development buffer 28B is cleared, and white-base background is produced in step S77.

If language-expressed data described in the PDL is registered at a predetermined position in the packet structure corresponding to the ith band (Yes in step S73), the data is read out in step S74, and developed into bit map data and written into the development buffer 28B in step S75. Specifically, the language-expressed data is combined with the background data in the development buffer by writing the language-expressed data over the background data.

As long as registered data exists, the data is written into the development buffer. When the registered data runs out (No in step S73), the data thinning operation is performed to reduce the amount of data while reducing the resolution in step S78. Specifically, the bit map data written in the development buffer is thinned. Despite the data thinning operation as described below, the print size will not change while the resolution decreases. This is because for actual printing, data replenishing operation is performed, for example, single line data is printed twice.

Figure 11:
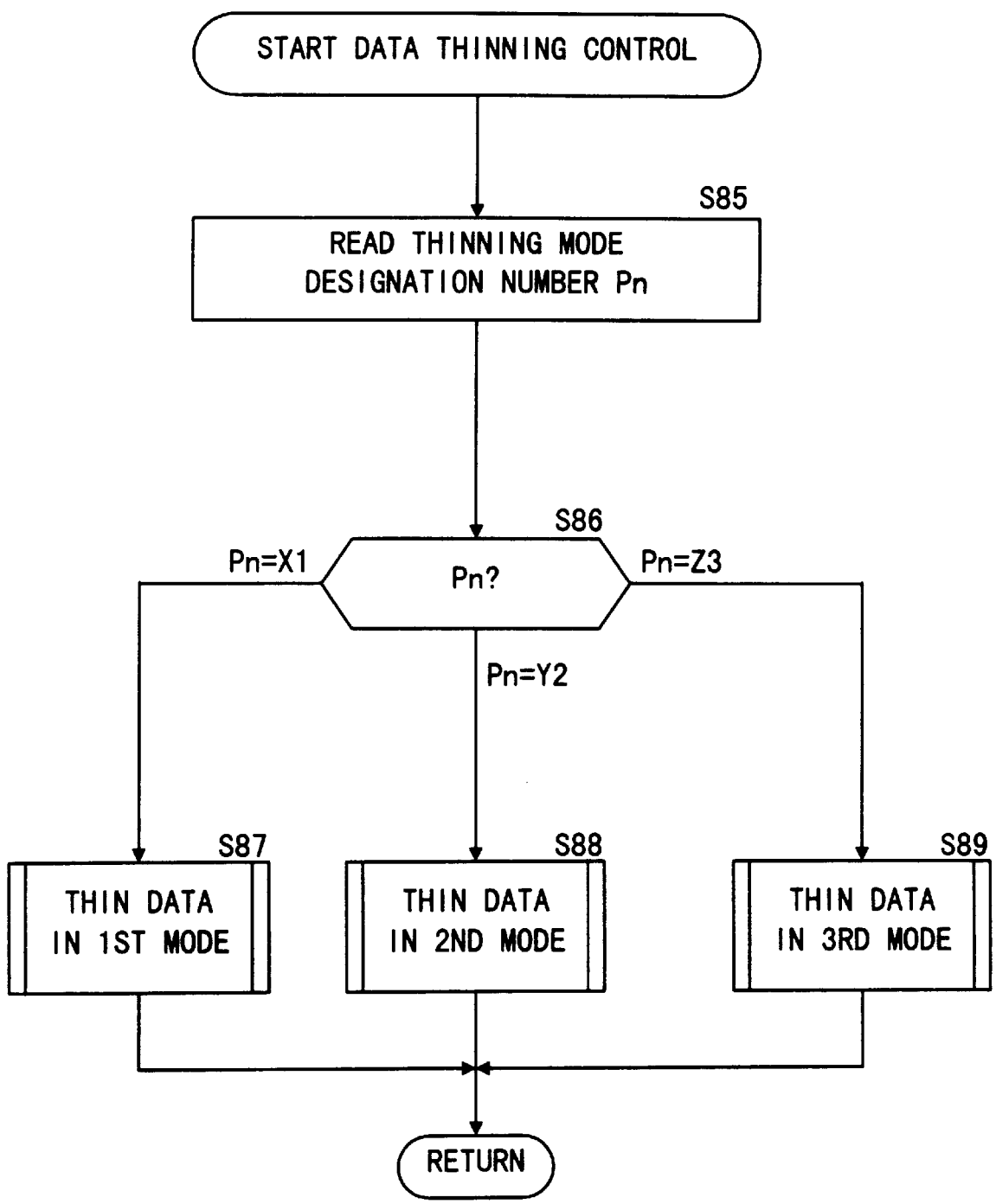
FIG. 11 is a schematic flowchart of a routine of data thinning control.

A routine of data thinning control will be described with reference to the flowchart of FIG. 11.

In step S85, the data thinning mode designation number Pn is read out. In step S86, the designation number Pn is identified. Steps S85 and S86 constitute a selection device, and step S52 constitutes a command interpreting device. If the designation number Pn="X1", the dot image data stored in the development buffer is thinned in the first data thinning mode corresponding to the error diffusion mode (binarization mode) in step S87. The control routine then returns. Specifically, dot image data is thinned at a high speed in the first data thinning mode to reduce the amount of data, and then re-stored into the development buffer, in the case of draft printing merely for checking a print result, or in the case of a character or symbol image or an image binarized in the error diffusion mode, as described with reference to FIGS. 3a and 3b.

If the designation number Pn="Y2", the dot image data stored in the development buffer is thinned in the second data thinning mode corresponding to the fatting dithering mode (binarization mode) in step S88. The control routine then returns. Specifically, dot image data is thinned in the second date thinning mode to reduce the amount of data, and then re-stored into the development buffer, in the case of a pop art-type line drawing image and similar images which have a low density variation and which have been binarized in the fatting dithering mode, as stated with reference to FIGS. 4a and 4b.

If the designation number Pn="Z3", the dot image data stored in the development buffer is thinned in the third data thinning mode corresponding to the Bayer dithering mode (binarization mode) in step S89. The control routine then returns. Specifically, dot image data is thinned in the third data thinning mode to reduce the amount of data, and then re-stored into the development buffer, in the case of a photo-image and similar images which have a high density variation and which have been binarized in the Bayer dithering mode, as stated with reference to FIGS. 5a and 5b.

In the memory requirement reducing control, the content of the development buffer 28B whose memory requirement has been reduced by the data compression is re-compressed and copied into the multi-purpose area 28C, and then set as a handle, and registered in the BG area of the packet structure in step S79. It is determined in step S80 whether the development of the dot image data of all the bands is completed. If the development of the dot image data is not completed for all the bands (No in step S80), the variable i is incremented in step S81. After the next band is designated, the operation described above is repeated.

If the development of the dot image data of all the bands is completed (Yes in step S80), a graphic cache secured along with the graphic data written into the development buffer, and a font cache storing font data along with the font data described in the PDL, are released as a usable memory in step S82. This control routine ends.

Subsequently, in the host-based data reception processing control, a memory is re-secured and a BG handle is set in step S64. It is determined in step S65 whether a memory has been successfully secured. If a memory could not be secured (No in step S65), error processing is performed in step S70. If a memory has been secured (Yes in step S65), the operation of step S66 and the subsequent steps is performed.

In the escape sequence processing control, if the read command is not either a binarization mode designation command or a graphic data reception command, the operation corresponding to the read command is performed in step S56. The control then ends and returns.

In the image data generating control, it is determined in step S33 whether the read data of 1 byte is a line feed command (LF). If the data is LF, a cursor position shifting operation is performed in step S44, for a line feed shift of the print position in the laser printer 3.

If the read data of 1 byte is font data, the determination in each of steps S32, S33 and S34 become negative. The characters indicated by the font data are registered as registered data in the packet structure in step S36. It is determined in step S37 whether the registration has succeeded. If the registration has succeeded (Yes in step S37), the operation of step S31 and the subsequent steps is repeatedly performed. Conversely, if the registration is unsuccessful because of an insufficient capacity of usable memory (No in step S37), the memory requirement reducing operation is performed in step S38. Specifically, the amount of data is reduced by the data thinning operation. After characters are re-registered in the packet structure in step S39, it is determined in step S40 whether re-registration has succeeded. If registration has succeeded (Yes in step S40), the operation of step S3 1 and the subsequent steps is repeatedly performed. If registration is unsuccessful (No in step S40), the error processing is performed in step S45.

Figure 12:
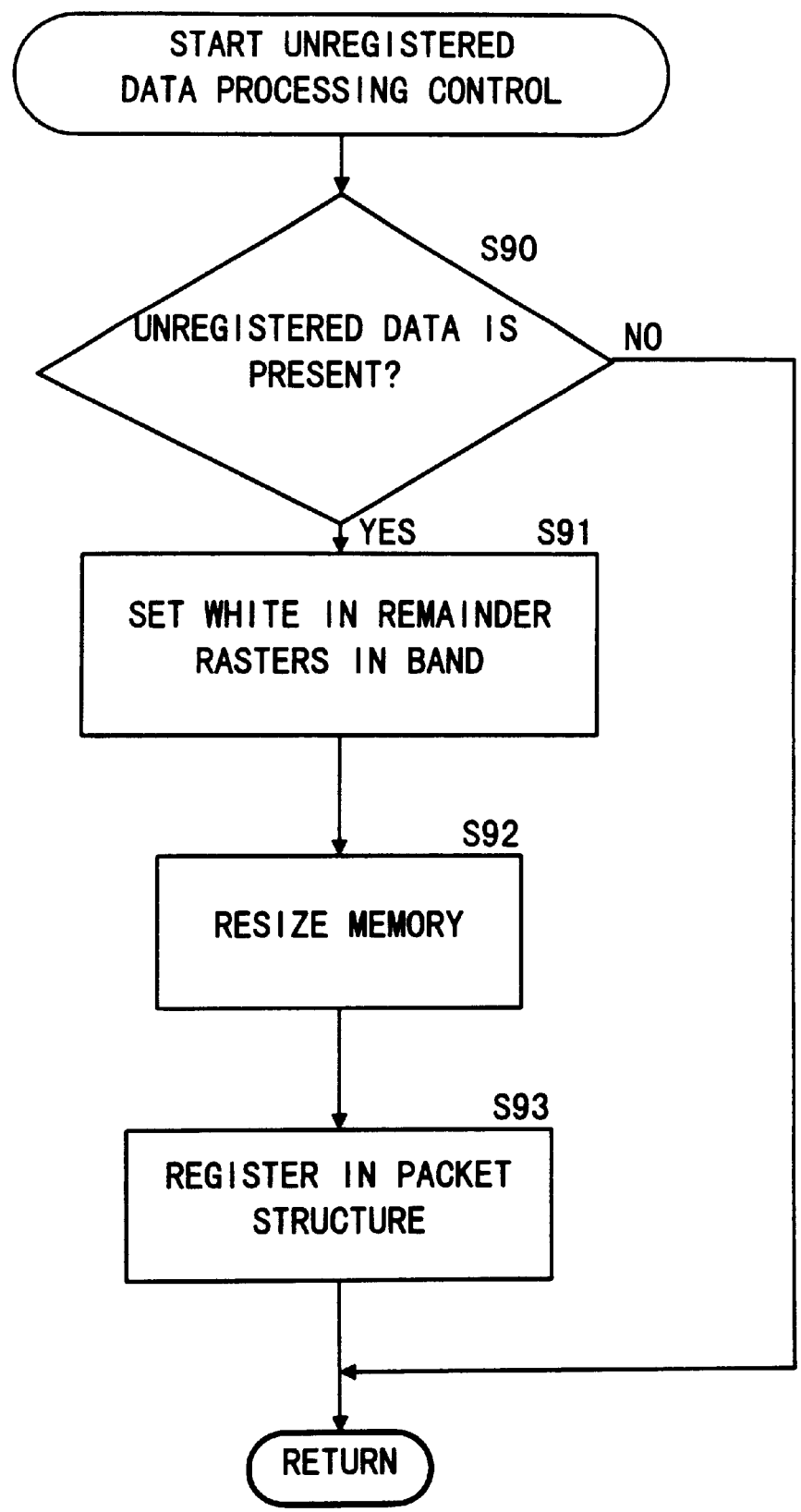
FIG. 12 is a schematic flowchart of a routine of unregistered data processing control.

When the processing of language expression data is completed so that a command data FF which is a print end command indicating the end of the page is read out (Yes in step S34), a routine of unregistered data processing control (see FIG. 12) is performed in step S42.

If the host-based data does not continue to the tail end of the band, the operation of steps S68, S69 is not performed, i.e., registration in the packet structure is not performed. Therefore, the unregistered data processing control is performed to register unregistered data in the packet structure before printing, so that printing becomes possible.

When unregistered data processing control is started, it is determined in step S90 whether unregistered data is present. If there is no unregistered data (No in step S90), the control ends and returns. Conversely, if the unregistered data is present (Yes in step S90), the remaining rasters of the corresponding band are set as white in step S91. That is, white is set into absent rasters. Subsequently, in step S92, the memory resizing operation is performed as in step S68. In step S93, a resized memory space is registered in the packet structure as in step S69. This control routine ends and returns.

Subsequently, in the image data generating control, three bands of data of the packet are developed in three development buffers, and the first raster is written out into a laser-output FIFO. Then, print interruption for starting the printing mechanism 23 is permitted in step S43.

Figure 13:
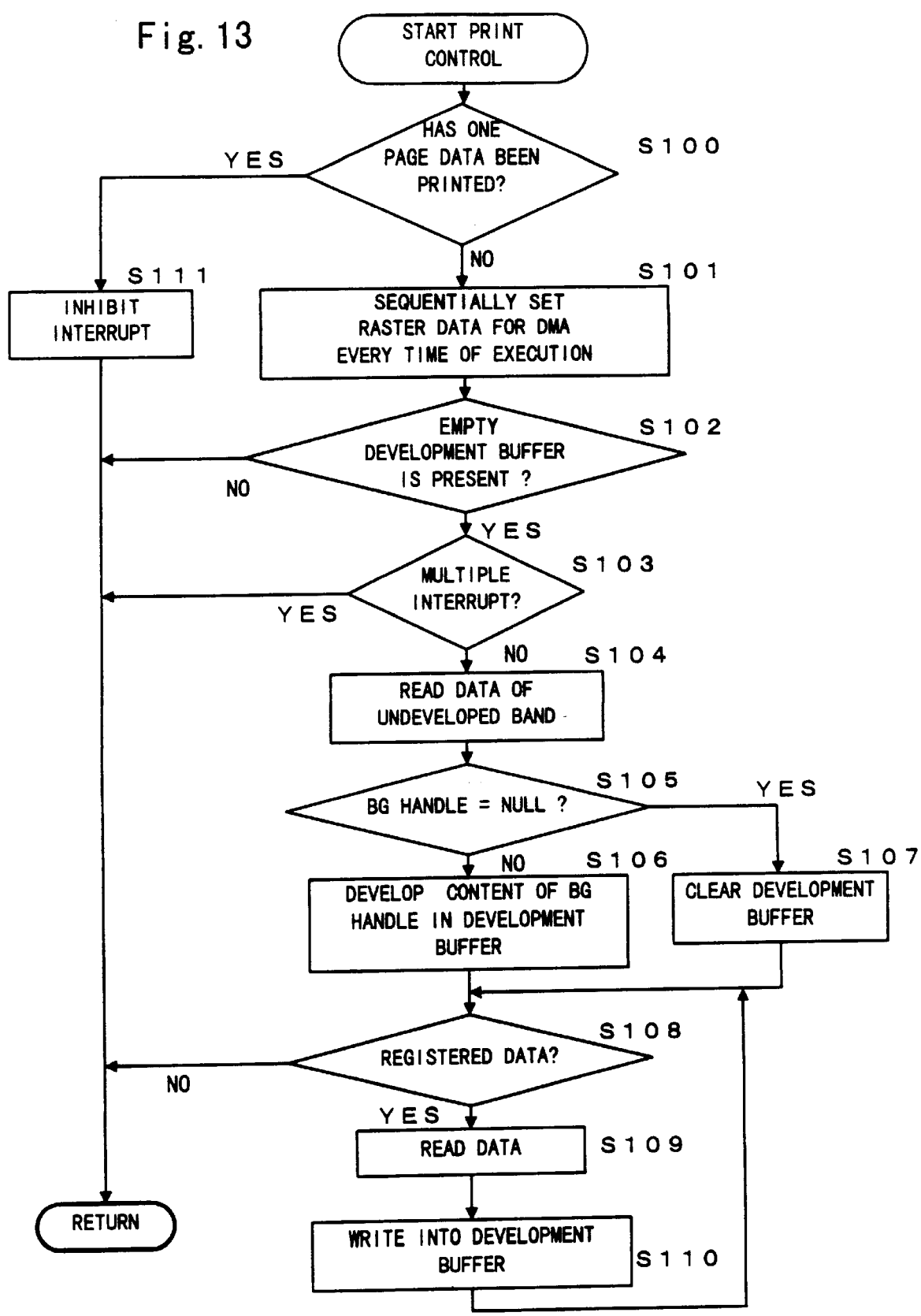
FIG. 13 is a schematic flowchart of a routine of print control.

A routine of print control performed by the interrupt will be described with reference to the flowchart of FIG. 13.

The print processing is an operation in which interrupt is performed every time data for one raster is outputted for printing (for example, a laser beam for the raster is outputted by a laser diode) and the laser output FIFO becomes empty, based on direct memory access control (DMAC). The FIFO data is outputted upon a beam-direct (BD) signal which is a horizontal synchronization signal outputted from the print mechanism 23.

The print interrupt occurs simultaneously when the FIFO becomes empty. In step S100, it is determined whether one page of printing has been completed. If the one page printing is not completed (No in step S100), the raster data present in the development buffer of the first band is set as an object of direct memory access (DMA) in step S101. Thereby, if the next interrupt occurs upon the next BD signal, the next raster data is outputted and printed. It is determined in step S102 whether there is an empty development buffer. If an empty development buffer does not exist (No in step S102), this control ends. If interrupt occurs again after the printing of the raster is completed, the next raster is set as an object of the DMA in step S101, and then printed.

Since the determination in step S102 continues to be negative until the entire data in a development buffer of a band is outputted and printed, the raster data is sequentially outputted and printed in step S101.

In step S103, it is determined whether there is multiple interrupt. If there is multiple interrupt (Yes in step S103) when there is an empty development buffer that has been empty from the beginning or that is formed by outputting and printing the entire raster data from the development buffer of the first band (Yes in step S102), this control ends. Conversely, if there is not multiple interrupt (No in step S103), registered data of a band that has not been developed in a development buffer is read out in step S104.

Since the number of development buffers (three development buffers are provided in this embodiment) is less than the total number of bands in a page, there may be a band that has not been developed in a development buffer. Therefore, in the operation of step S105 and subsequent steps, an undeveloped band is developed in a development buffer that is empty due to the print-out being completed. In this developing operation, the operation of step S101 is performed on the development buffer wherein print-out has not been completed, by multiple interrupt, thereby continuing the print-out processing.

It is determined in step S105 whether the BG handle of the extracted band is null. If the BG handle is not null (No in step S105), the content of the memory space designated by the BG handle is developed in the empty buffer so that background bit map data is formed in step S106. Conversely, if the BG handle is null (Yes in step S105), the empty development buffer is cleared and white background is formed in step S107.

It is determined in step S108 whether there is registered data of the band extracted, i.e., language expression data. If there is no language expression data (No in step S108), it means that development in the development buffers has been completed. Therefore, this control ends.

Conversely, if there is registered data (Yes in step S108), the data is read in step S109. The language expression data is developed into bit map data and written into a development buffer in step S110. The operation of step S108–S110 is repeatedly performed. When there is no registered data left unprocessed (No in step S108), this control ends.

In this manner, registered data in the packet structure is sequentially developed, and raster data is sequentially outputted from the development buffers, and then printed. When one page of printing is completed (Yes in step S100), print control interrupt is inhibited in step S111. The operation then returns. Every time the print command FF is read out, the print control for each page is performed through the processing described above.

As is apparent from the above description, in the personal computer 2 for generating input data, a plurality of binarization modes are provided so that a desired mode can be selected. Image data is converted into binary image data in a selected binarization mode. The binary image data and the designation number Dn of the selected binarization mode are transmitted to the laser printer 3. In the laser printer 3, control programs for a plurality of data thinning controls (the first to third data thinning controls) are provided. When the capacity of a development buffer to store dot image data to be supplied for printing becomes insufficient, the designation number Dn of the binarization mode is interpreted, and a data thinning mode designation number Pn corresponding to the designation number Dn is selected. Then, the amount of dot image data is reduced in the data thinning mode designated by the selected designation number Pn. Therefore, if dot image data is data for draft printing, or data of a character or symbol image, the dot image data is thinned in the first data thinning mode, which is suitable for the original image. If dot image data is data of an image, such as a photo-image, in which density tone is important, or data of a pop art-type line drawing image, the dot image data is thinned in the second or third thinning mode, which is suitable for the original image.

Since the binarization modes include the error diffusion mode, the fatting dithering mode and the Bayer dithering mode, binarization can be performed in a mode suitable for an original image, by selecting from the plurality of binarization modes in accordance with the type of the original image.

In a modification of the foregoing embodiment, it is also possible to automatically select a data thinning mode on the basis of the type of command detected or the amount of font data contained in dot image data for compression of dot image data in the development buffer in the laser printer 3. It is also possible to select a data thinning mode by operating the operating panel 22. Furthermore, it is possible to employ various compression modes other than the data thinning operations in order to reduce the amount of dot image data. Further, the invention may be applied to various print data processing apparatuses, for example, various page printers, other than the laser printer 3, and various input data generating apparatuses, such as word processors, other than the personal computer.

It is to be understood that the invention is not restricted to the particular forms shown in the foregoing embodiment. Various modifications and alternations can be made thereto without departing from the scope of the invention encompassed by the appended claims.

What is claimed is:

1. A print data processing apparatus comprising:
    a memory that stores dot image data;
    a plurality of irreversible compression devices that can be started when a capacity of the memory is insufficient to store dot image data, the irreversible compression devices irreversibly compressing the dot image data by thinning the dot image data and storing the compressed dot image data into the memory wherein the irreversible compression devices include:
        a simple thinning device that, if the dot image data is character data, symbol data, or data binarized in an error diffusion mode, deletes every other row of dot data and every other column of dot data,
        a second thinning device that, if the dot image data has been binarized in a fatting dithering mode, reduces the amount of the dot image data using error evaluation of rows and columns of dot data; and
        a third thinning device that, if the dot image data has been binarized in Bayer dithering mode, reduces the amount of the dot image data using weighted error evaluation of rows and columns of dot data;
    a compression mode selection device that, if the capacity of the memory is insufficient to store dot image data, selects one of the plurality of irreversible compression devices depending on whether the dot image data is at least one of character data, symbol data, draft printing data or image data and starts the selected irreversible compression device; and
    a printing device that prints the dot image data which has been compressed and stored in the memory by the selected irreversible compression device.

2. The print data processing apparatus according to claim 1, wherein the compression mode selection device includes a designation command interpreting device that interprets a compression mode designation command supplied from an input data generating apparatus.

3. The print data processing apparatus according to claim 1, wherein the memory includes a multi-purpose area for storing dot image data received from a development buffer provided in a RAM.

4. An input data generating apparatus for supplying input data to the print data processing apparatus according to claim 2, comprising:

a binarization mode selection device that selects one of a plurality of binarization modes for data binarization;

a conversion device that converts original image data into binary image data in the binarization mode selected by the binarization mode selection device; and a designation command generating device that generates a compression mode-designating command corresponding to the binarization mode selected by the binarization mode selection device.

5. The input data generating apparatus according to claim 4, wherein the plurality of binarization modes include an error diffusion mode, a fatting dithering mode, and a Bayer dithering mode.

6. A print data processing apparatus comprising:

means for storing dot image data;

a plurality of irreversible compression means for irreversibly compressing the dot image data by thinning the dot image data and storing the compressed dot image data into the means for storing which can be started when a capacity of the means for storing is insufficient to store dot image data, wherein the irreversible compression means include:

a simple thinning means that, if the dot image data is character data, symbol data, or data binarized in an error diffusion mode, deletes every other row of dot data and every other column of dot data;

a second thinning means that, if the dot image data has been binarized in a fatting dithering mode, reduces the amount of the dot image data using error evaluation of rows and columns of dot data; and a third thinning means that, if the dot image data has been binarized in Bayer dithering mode, reduces the amount of the dot image data using weighted error evaluation of rows and columns of dot data;

means for selecting one of the plurality of irreversible compression means depending on whether the dot image data is at least one of character data, symbol data, draft printing data or image data of the dot image data and starting the selected irreversible compression means if the capacity of the means for storing is insufficient to store dot image data; and means for printing the dot image data which has been compressed and stored in the means for storing by the selected irreversible compression means.

7. The print data processing apparatus according to claim 6, wherein the means for irreversibly compressing includes a designation command interpreting means for interpreting a compression mode designation command supplied from an input data generating apparatus.

8. The print data processing apparatus according to claim 6, wherein the means for storing includes a multi-purpose area for storing dot image data received from a development buffer provided in a RAM.

9. An input data generating apparatus for supplying input data to the print data processing apparatus according to claim 7, comprising:

means for selecting one of a plurality of binarization modes for data binarization;

means for converting original image data into binary image data in the binarization mode selected by the means for selecting; and means for generating a compression mode-designating command corresponding to the binarization mode selected by the means for selecting.

10. The input data generating apparatus according to claim 9, wherein the plurality of binarization modes include an error diffusion mode, a fatting dithering mode, and a Bayer dithering mode.

11. A method of processing print data comprising the steps of:

storing dot image data;

irreversibly compressing the dot image data by thinning the dot image data and storing the compressed dot image data into a memory with a plurality of irreversible compression devices that can be started when a capacity of the memory is insufficient to store dot image data, wherein the step of irreversibly compressing includes:

deleting every other row of dot data and every other column of dot data if the dot image data is character data, symbol data, or data binarized in an error diffusion mode;

reducing the amount of the dot image data using error evaluation of rows and columns of dot data if the dot image data has been binarized in a fatting dithering mode; and reducing the amount of the dot image data using weighted error evaluation of rows and columns of dot data if the dot image data has been binarized in Bayer dithering mode;

selecting one of the plurality of irreversible compression devices depending on whether the dot image data is at least one of character data, symbol data, draft printing data or image data of the dot image data and starting the selected irreversible compression device with a compression mode selection device if the capacity of the memory is insufficient to store dot image data; and printing the dot image data which has been compressed and stored in the memory by the selected irreversible compression device.

12. The method according to claim 11, wherein the step of selecting includes interpreting a compression mode designation command supplied from an input data generating apparatus with a designation command interpreting device.

13. The method according to claim 11, wherein the step of storing includes storing dot image data received from a development buffer provided in a RAM.

14. A method of supplying input data to the method of processing print data according to claim 12, comprising the steps of:

selecting one of a plurality of binarization modes for data binarization with a binarization mode selection device;

converting original image data into binary image data in the binarization mode selected by the binarization mode selection device with a conversion device; and generating a compression mode-designating command corresponding to the binarization mode selected by the binarization mode selection device with a designation command generating device.

15. A storage medium for storing programs to process print data, comprising programs to:

store dot image data;

irreversibly compress the dot image data by thinning the dot image data and store the compressed dot image data into a memory with a plurality of irreversible compression programs that can be started when a capacity of the memory is insufficient to store dot image data, wherein the irreversible compression programs include:

a simple thinning program that, if the dot image data is character data, symbol data, or data binarized in an error diffusion mode, deletes every other row of dot data and every other column of dot data;

a second thinning program that, if the dot image data has been binarized in a fatting dithering mode, reduces the amount of the dot image data using error evaluation of rows and columns of dot data; and a third thinning program that, if the dot image data has been binarized in Bayer dithering mode, reduces the amount of the dot image data using weighted error evaluation of rows and columns of dot data;

select one of the plurality of irreversible compression programs depending on whether the dot image data is at least one of character data, symbol data, draft printing data or image data of the dot image data and start the selected irreversible compression programs if the capacity of the memory is insufficient to store dot image data; and print the dot image data which has been compressed and stored in the memory by the selected irreversible compression program.

* * * * *